(12) United States Patent
Hart (10) Patent No.: US 8,958,222 B2
(45) Date of Patent: Feb. 17, 2015

(54) MODULATION OF SWITCHING SIGNALS IN POWER CONVERTERS

(71) Applicant: Control Techniques Limited, Newtown (GB)

(72) Inventor: Simon David Hart, Welshpool (GB)

(73) Assignee: Control Techniques Limited, Newtown (GB)

( * ) Notice: Subject to any disclaimer, the term of this patent is extended or adjusted under 35 U.S.C. 154(b) by 0 days.

(21) Appl. No.: 13/969,992

(22) Filed: Aug. 19, 2013

(65) Prior Publication Data

US 2014/0049999 A1 Feb. 20, 2014

(30) Foreign Application Priority Data

Aug. 20, 2012 (GB) .................................. 1214860.7

(51) Int. Cl.
*H02M 5/42* (2006.01)
*H02M 7/539* (2006.01)

(52) U.S. Cl.
CPC ...................................... *H02M 7/539* (2013.01)
USPC ................................ 363/98; 363/41; 363/132

(58) Field of Classification Search
USPC .................................. 323/41, 97, 98, 131, 132
See application file for complete search history.

(56) References Cited

U.S. PATENT DOCUMENTS

| | | | |
|---|---|---|---|
| 6,043,996 A * | 3/2000 | Kumar | 363/41 |
| 6,204,649 B1 | 3/2001 | Roman | |
| 6,600,669 B2 | 7/2003 | Trzynadlowski et al. | |
| 6,914,409 B2 * | 7/2005 | Nukushina | 318/800 |
| 6,972,534 B1 | 12/2005 | Schulz et al. | |
| 7,589,984 B2 * | 9/2009 | Salomaki | 363/41 |
| 7,751,210 B2 * | 7/2010 | Goto | 363/98 |
| 8,107,267 B2 * | 1/2012 | Tallam et al. | 363/37 |
| 8,503,207 B2 * | 8/2013 | Tallam et al. | 363/98 |
| 8,604,730 B2 * | 12/2013 | Suzuki | 318/400.02 |
| 8,605,461 B2 * | 12/2013 | Hibino | 363/17 |
| 8,659,917 B2 * | 2/2014 | Sakakibara | 363/37 |
| 8,674,647 B2 * | 3/2014 | Iwaji et al. | 318/700 |
| 2004/0130918 A1 * | 7/2004 | Ho | 363/41 |
| 2009/0323232 A1 * | 12/2009 | Suzuki et al. | 361/23 |
| 2012/0113701 A1 * | 5/2012 | Wang et al. | 363/132 |
| 2012/0146565 A1 | 6/2012 | Parenti | |

* cited by examiner

*Primary Examiner* — Jue Zhang
*Assistant Examiner* — Lakaisha Jackson
(74) *Attorney, Agent, or Firm* — Harness, Dickey & Pierce, P.L.C.

(57) ABSTRACT

There is provided a method and control system for reducing noise in a power converter by controlling a switching device in the power converter according to a modulation scheme. The switching device couples a direct current (DC) source to provide an alternating current (AC) output at a particular switching frequency. The method includes the step of, in each switching period, switching the switching device between active configurations providing a finite voltage at the output and inactive configurations providing a zero voltage at the output. The ratio between the total period of time in which the switching device is in an active configuration and the total period of time in which the switching device is in an inactive configuration is the same for each switching period and is determined according to the desired voltage at the AC output.

18 Claims, 3 Drawing Sheets

MODULATION OF SWITCHING SIGNALS IN POWER CONVERTERS

CROSS-REFERENCE TO RELATED APPLICATION

This application claims the benefit and priority of Great Britain Patent Application No. 1214860.7 filed Aug. 20, 2012. The entire disclosure of the above application is incorporated herein by reference.

FIELD OF THE INVENTION

The present invention relates to a method and control system for reducing noise in a power converter by modulating switching signals in a switching device of the power converter.

BACKGROUND OF THE INVENTION

Figure 1:
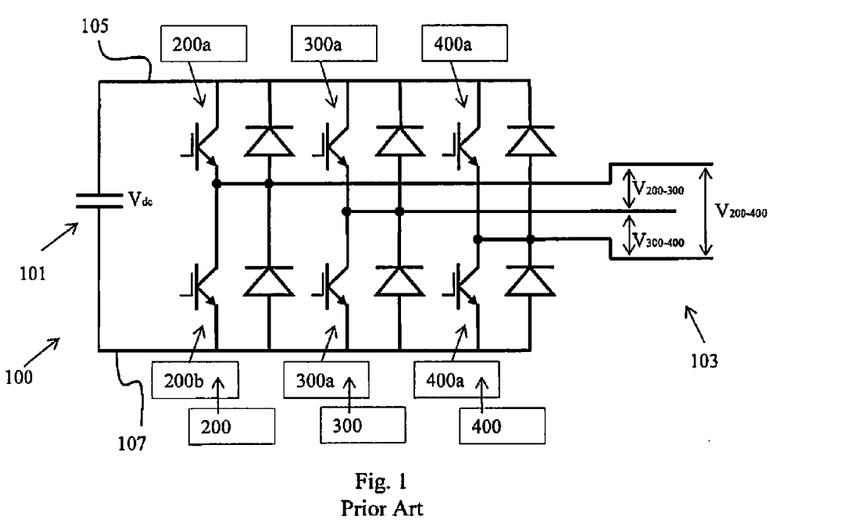
FIG. 1 shows a three phase inverter according to the prior art.

FIG. 1 shows a well-known three phase power inverter 100 for converting a DC power supply 101 to an AC output 103. The inverter comprises three separate phases 200, 300, 400. Each phase includes two switches in series: 200a, 200b in phase 200; 300a, 300b in phase 300; and 400a, 400b in phase 400. Switches 200a, 300a and 400a are connected to the positive rail 105 and switches 200b, 300b and 400b are connected to the negative rail 107. In FIG. 1, each switch is an IGBT (insulated gate bipolar transistor). However, any switches with fast switching capability may be used.

Figure 2:
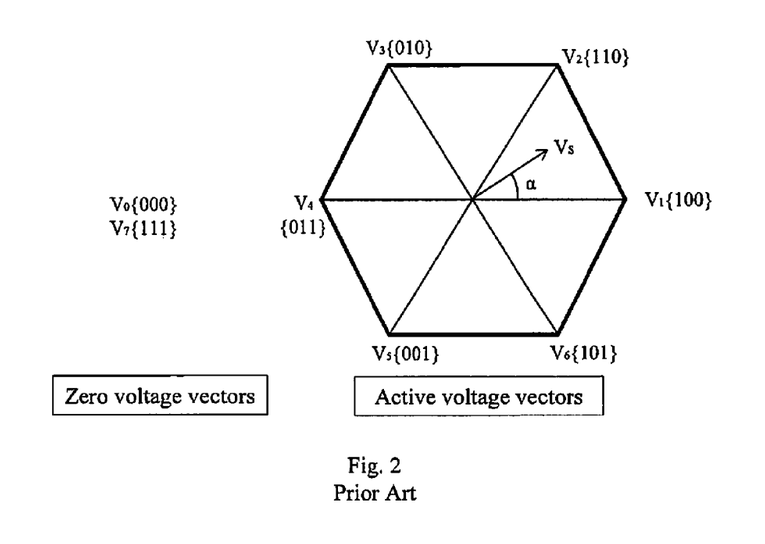
FIG. 2 shows a voltage switching hexagon for the three phase inverter of FIG. 1.

A sinusoidal output current can be created at AC output 103 by a combination of switching states of the six switches. However, the inverter 100 must be controlled so that the two switches in the same phase are never switched on at the same time, so that the DC supply 101 is not shorted out. Thus, if 200a is on, 200b must be off and vice versa; if 300a is on, 300b must be off and vice versa; and if 400a is on, 400b must be off and vice versa. This results in eight possible switching vectors for the inverter, as shown in Table 1. In Table 1, the vector values are the states of the three upper switches 200a, 300a, 400a, with the three lower switches 200b, 300b, 400b necessarily taking the opposite state to avoid shorting out the DC supply.

active vector VS (comprising components of V1 to V6) (the modulation index) by pulse width modulation (PWM) techniques.

Figure 3:
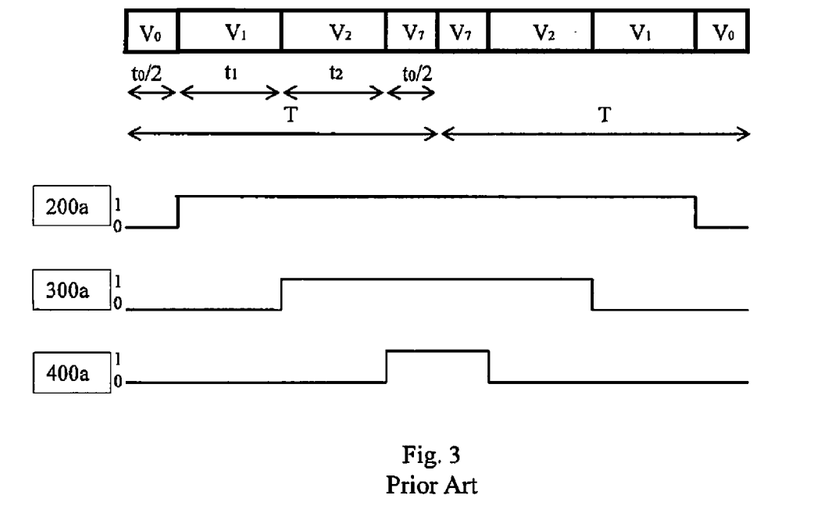
FIG. 3 shows an example of space vector modulation over one switching period according to the prior art.

FIG. 3 shows an example of pulse width space vector modulation over one switching period according to the prior art. The switching function for each switch 200a, 300a, 400a is a time waveform taking the value 1 when the switch is on and 0 when the switch is off. Referring to FIG. 3, during the first period t0/2, all three switches 200a, 300a, 400a are off (value 0) which produces vector V0 of Table 1. V0 is a zero voltage vector, so this time period is an inactive period. In the second period t1, switch 200a takes the value 1 and switches 300a and 400a take the value 0, which produces vector V1, which is an active vector. In the third period t2, switches 200a and 300a take the value 1 and switch 400a takes the value 0, which produces vector V2, which is also an active vector. Finally, during the fourth period t0/2, all three switches 200a, 300a, 400a are on (value 1) which produces zero voltage vector V7 of Table 1. Thus, the active periods are t1 and t2 and the inactive period is t0. The ratio between the total active period (in this case, t1+t2) and total inactive period (in this case, t0/2+t0/2=t0) determines the output voltage at the AC output.

The resulting waveforms at the AC output generally have spectral components at integer multiples of the fundamental frequency. A large proportion of the discernible, and annoying, inverter switching noise is produced by these components of the switching frequency. This issue is of even more concern if there are periodic components in the output voltage. Harmonic components may also create mechanical resonance, which can be problematic in mechanical systems.

Because of this, and other, problems, the control of switching converters is an area of increasing interest. Various techniques have already been employed to tackle the problem of inverter switching noise. For example, the switching period may be varied from one period to the next, either using a sweep, band limited white noise or random weighting. This reduces the peak of the switching frequency fundamental component by spreading the frequencies. However, this method requires a complex PWM modulator and the continual re-scaling of the current measurement or gain, within a closed loop current control system. Another approach is the

TABLE 1

| Vector | 200a | 300a | 400a | 200b | 300b | 400b | $V_{200\text{-}300}$ | $V_{300\text{-}400}$ | $V_{200\text{-}400}$ | |
|---|---|---|---|---|---|---|---|---|---|---|
| $V_0 = \{000\}$ | OFF | OFF | OFF | ON | ON | ON | 0 | 0 | 0 | Zero |
| $V_1 = \{100\}$ | ON | OFF | OFF | OFF | ON | ON | $+V_{dc}$ | 0 | $-V_{dc}$ | Active |
| $V_2 = \{110\}$ | ON | ON | OFF | OFF | OFF | ON | 0 | $+V_{dc}$ | $-V_{dc}$ | Active |
| $V_3 = \{010\}$ | OFF | ON | OFF | ON | OFF | ON | $-V_{dc}$ | $+V_{dc}$ | 0 | Active |
| $V_4 = \{011\}$ | OFF | ON | ON | ON | OFF | OFF | $-V_{dc}$ | 0 | $+V_{dc}$ | Active |
| $V_5 = \{001\}$ | OFF | OFF | ON | ON | ON | OFF | 0 | $-V_{dc}$ | $+V_{dc}$ | Active |
| $V_6 = \{101\}$ | ON | OFF | ON | OFF | ON | OFF | $+V_{dc}$ | $-V_{dc}$ | 0 | Active |
| $V_7 = \{111\}$ | ON | ON | ON | OFF | OFF | OFF | 0 | 0 | 0 | Zero |

FIG. 2 shows the six active vectors and the two zero voltage vectors of Table 1 graphically portrayed in an inverter voltage switching hexagon. Vectorial representation of three-phase systems is well known to the skilled person and will not be described in detail. However, in general, any three-phase system can be represented uniquely by a rotating vector VS, as shown in FIG. 2. The rotating vector VS comprises components of the six active vectors shown in Table 1 and FIG. 2. The voltage at the AC output 103 can be changed by varying the ratio between the zero voltage vectors V0 and V7 and the use of an injected period at a higher and non-multiple switching frequency. In this method, a pattern of periods of a higher switching frequency is swapped for the nominal switching frequency period pattern at intervals of multiples of the nominal switching frequency period pattern. However, a disadvantage of this method is the reduced accuracy of the inverter thermal model which generally runs at a slower cycle than the injection cycle.

It is an object of the invention to provide an improved method and control system for reducing noise in a power converter.

SUMMARY OF THE INVENTION

According to a first aspect of the invention, there is provided a method for reducing noise in a power converter by controlling a switching device in the power converter according to a modulation scheme, the switching device for coupling a direct current (DC) source to provide an alternating current (AC) output at a particular switching frequency, the method comprising the step of: in each switching period, switching the switching device between active configurations providing a finite voltage at the output and inactive configurations providing a zero voltage at the output; wherein the ratio between the total period of time in which the switching device is in an active configuration and the total period of time in which the switching device is in an inactive configuration is the same for each switching period and is determined according to the desired voltage at the AC output; and wherein, in each switching period, there are at least two time periods in which the switching device is in an inactive configuration, and the ratio between those at least two time periods is changed every switching period.

The method of the invention varies the non-active (zero voltage) portion of the modulation scheme. The ratio between the total non-active portion and the total active portion is kept the same for all the switching periods, according to the desired output voltage. However, the ratio between the at least two inactive time periods changes in each switching period (whilst keeping the total non-active portion the same). The inventors have found that this produces a reduced acoustic noise peak at the switching frequency, without altering the switching period or swapping between switching frequencies. This method does not require a complex pulse width modulator. This method also does not require continual re-scaling of the current measurement or gain. This method also does not suffer from issues of inaccuracy often experienced in prior art methods.

The method of the invention is particularly advantageous for low output voltages. This is because the ratio between the total period of time in which the switching device is in an active configuration and the total period of time in which the switching device is in an inactive configuration is determined according to the desired output voltage. The required output voltage depends roughly on the ratio of the DC bus and the peak of the AC required. A higher desired output voltage requires a smaller proportion of time in the inactive configuration and a lower desired output voltage requires a larger proportion of time in the inactive configuration. The larger the time in the inactive configuration, the more the ratio between the at least two inactive time periods can be varied, so the more effective the method. The method has a lower effect once the total inactive period is less than the total active period i.e. at higher voltages. The AC voltage requirement generally depends on the machine speed or torque. Low output voltage may be required for half speed at full torque or full speed at low torque (for example in fans, pumps and conveyers).

The ratio between the at least two time periods in which the switching device is in an inactive configuration may be changed every switching period in dependence upon a random sequence generated for each switching period. A random sequence is advantageous as it reduces the periodic content of the variation. Symmetrical modulation methods in which at least two time periods in which the switching device is in an inactive configuration are equal in length may be advantageous because current flow (and hence heating) may be balanced between a first inactive configuration and a second inactive configuration. Using a random sequence to determine the ratio between the at least two time periods in which the switching device is in an inactive configuration may achieve the same balance without symmetrical modulation.

The random sequence preferably comprises 256 elements. A 256 element sequence is easy to control in software since it is a power of 2 in length. Sequences larger than 256 elements provide diminishing returns and require more processing capacity. However, other sequence lengths are possible and a sequence length may chosen which is appropriate for the system, which may depend on the switching frequency, the resources and the thermal balancing. Random or frequency bounded white noise data may alternatively be used to determine the ratio between the at least two inactive time periods in a given switching period.

Preferably, the power converter comprises a three phase power inverter. The switching device in the three phase inverter comprises three phases, each phase including two switches in series. One switch in each phase is connected to a positive rail, the other switch in each phase is connected to a negative rail and an output is connected between the two switches in each phase. However, the power converter need not comprise a three phase power inverter and the invention is applicable to any multilevel inverter.

Preferably, the method employs a space vector modulation scheme for controlling the power converter switching device. This is advantageous as it is able to produce a large range of output voltages. However, the invention is also applicable to individual phase pulse width modulation (PWM) schemes.

Preferably, at least one of the switches in the three phase inverter is an insulated gate bipolar transistor (IGBT). Even more preferably, all the switches are IGBTs. IGBTs have fast switching capability and are also highly efficient. In addition, if a 256 element random sequence is used to determine the ratio between the at least two time periods in which the switching device is in an inactive configuration, at 2 kHz, the 256 element sequence completes in 128 ms. Thus, the current flow between inactive configurations (upper and lower switches in each phase) will balance approximately every 128 ms which is approximately the time taken for many IGBTs to heat up. IGBTs may be included in any inverters, not only three phase inverters.

In one embodiment, the ratio between the at least two time periods in which the switching device is in an inactive configuration is weighted towards configurations in which a selected switch in each phase of the three phase inverter is on. This is because phase current may be measured in series with the lower (or upper) switches of the three phase inverter. In that case, in order to give sufficient time for the current to be measured, those switches must be switched on for a certain period of time. In order to achieve this, the ratio is weighted towards configurations in which those switches are on, rather than off. This may be achieved by setting the random sequence to favour the configuration or configurations in which those switches are on, rather than off. Alternatively, this may be achieved by setting a minimum (non-zero) value for the time in the configurations in which those switches are on. The weighting allows sufficient time for the phase current to be measured.

According to a second aspect of the invention, there is provided a control system for reducing noise in a power converter switching device, the switching device for coupling a direct current (DC) source to provide an alternating current (AC) output at a particular switching frequency, the control system comprising: a controller for switching the switching device in the power converter according to a modulation scheme, the controller being arranged to switch the switching device, in each switching period, between active configurations providing a finite voltage at the output and inactive configurations providing a zero voltage at the output; wherein the ratio between the total period of time in which the switching device is in an active configuration and the total period of time in which the switching device is in an inactive configuration is the same for each switching period and is determined according to the desired voltage at the AC output; and wherein, in each switching period, there are at least two time periods in which the switching device is in an inactive configuration, and the ratio between those at least two time periods is changed every switching period.

The control system of the invention varies the non-active (zero voltage) portion of the modulation scheme. The ratio between the total non-active portion and the total active portion is kept the same for all the switching periods, according to the desired output voltage. However, the ratio between the at least two inactive time periods changes in each switching period (whilst keeping the total non-active portion the same). This produces a reduced acoustic noise peak at the switching frequency, without altering the switching period or swapping between switching frequencies. The control system is particularly advantageous for low output voltages.

The ratio between the at least two time periods in which the switching device is in an inactive configuration may be changed every switching period in dependence upon a random sequence generated for each switching period. A random sequence is advantageous as it may reduce the periodic content of the variation and may also allow current balancing.

The random sequence preferably comprises 256 elements.

Preferably, the power converter comprises a three phase power inverter. The three phase inverter comprises three phases, each phase including two switches in series. One switch in each phase is connected to a positive rail, the other switch in each phase is connected to a negative rail and an output is connected between the two switches in each phase. However, the power converter need not comprise a three phase power inverter and the invention is applicable to any multilevel inverter.

Preferably, at least one of the switches in the three phase inverter is an insulated gate bipolar transistor (IGBT). Even more preferably, all the switches are IGBTs. IGBTs may be included in any switching device, not only three phase inverters.

In one embodiment, the ratio between the at least two time periods in which the switching device is in an inactive configuration is weighted towards configurations in which a selected switch in each phase of the three phase inverter is on. This is because phase current may be measured in series with the lower (or upper) switches of the three phase inverter. In that case, in order to give sufficient time for the current to be measured, those switches must be switched on for a certain period of time. In order to achieve this, the ratio is weighted towards configurations in which those switches are on, rather than off. This may be achieved by setting the random sequence to favour the configuration or configurations in which those switches are on, rather than off. Alternatively, this may be achieved by setting a minimum (non-zero) value for the time in the configurations in which those switches are on. The weighting allows sufficient time for the phase current to be measured.

According to a third aspect of the invention, there is provided a switching power converter comprising: a switching device for coupling a direct current (DC) source to provide an alternating current (AC) output at a particular switching frequency; and a controller for reducing noise in the power converter by switching the switching device according to a modulation scheme, the controller being arranged to switch the switching device, in each switching period, between active configurations providing a finite voltage at the output and inactive configurations providing a zero voltage at the output; wherein the ratio between the total period of time in which the switching device is in an active configuration and the total period of time in which the switching device is in an inactive configuration is the same for each switching period and is determined according to the desired voltage at the AC output; and wherein, in each switching period, there are at least two time periods in which the switching device is in an inactive configuration, and the ratio between those at least two time periods is changed every switching period.

The controller in the switching power converter varies the inactive portion of the modulation scheme, whilst keeping the ratio between the total inactive portion and the total active portion the same for all the switching periods, according to the desired output voltage. The ratio between the at least two inactive time periods changes in each switching period. This produces a reduced acoustic noise peak at the switching frequency, without altering the switching period or swapping between switching frequencies, and is particularly advantageous for low output voltages.

The ratio between the at least two time periods in which the switching device is in an inactive configuration may be changed every switching period in dependence upon a random sequence generated for each switching period. A random sequence is advantageous as it may reduce the periodic content of the variation and may also allow current balancing.

The random sequence may comprise 256 elements.

The power converter may comprise a three phase power inverter. However, the invention is also applicable to any multilevel inverter.

At least one of the switches in the three phase inverter may be an insulated gate bipolar transistor (IGBT). Even more preferably, all the switches are IGBTs. IGBTs may be included in any switching device, not only three phase inverters.

In an embodiment, the ratio between the at least two time periods in which the switching device is in an inactive configuration is weighted towards configurations in which a selected switch in each phase of the three phase inverter is on. This is because phase current may be measured in series with the lower (or upper) switches of the three phase inverter. In that case, in order to give sufficient time for the current to be measured, those switches must be switched on for a certain period of time.

Features and advantages described in relation to one aspect of the invention may also be applicable to another aspect of the invention.

BRIEF DESCRIPTION OF THE DRAWINGS

Prior art arrangements have already been described with reference to accompanying FIGS. 1 to 3, in which.

The invention will now be further described, by way of example only, with reference to accompanying FIGS. 4 to 8, in which.

DETAILED DESCRIPTION

Symmetrical modulation methods, such as that described with reference to FIG. 3, split the inactive period t0 in half, placing one half t0/2 before the active period and the other half t0/2 after the active period. Thus, in each switching period, there is a symmetric switching pattern. However, the inventors of the present invention have found that using a particular non-symmetric switching pattern can reduce the acoustic noise due to the periodicity of the switching period.

Figure 4:
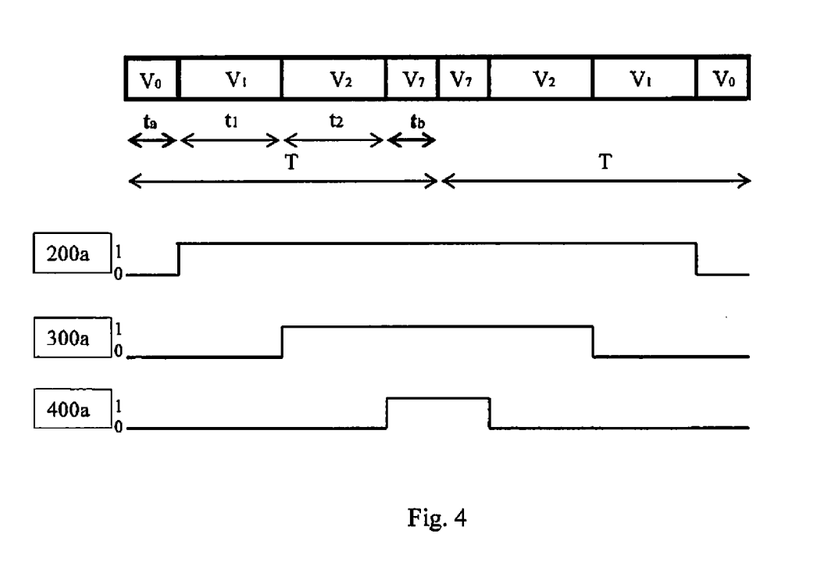
FIG. 4 shows an example of space vector modulation over one switching period according to an embodiment of the invention.

FIG. 4 shows an example of pulse width space vector modulation over one switching period according to an embodiment of the invention. Again, the switching function for each switch 200a, 300a, 400a is a time waveform taking the value 1 when the switch is on and 0 when the switch is off. In FIG. 4, the total active period is t1+t2, as before, and the total inactive period is t0 as before. However, in the modulation scheme illustrated in FIG. 4, the total inactive period t0 includes a portion ta before the active period and a portion tb after the active period, where ta+tb=t0. However, ta and tb are not necessarily equal, so the switching pattern may not be symmetric. Changing the ratio of ta:tb can reduce the acoustic noise.

The inventors have found that changing the ratio of ta:tb every switching period (whilst keeping ta+tb=t0 to produce the desired output voltage) reduces inverter switching noise. This is particularly advantageous for low output voltage because low output voltages require larger t0, allowing larger variation between ta and tb.

The preferred ratio of ta:tb in a given switching period is set based on a 256 element random sequence. That is, the ratio of 1:0 in a 256 element random binary signal for a switching period determines the ratio of ta:tb in that switching period. A random sequence is advantageous as it reduces the periodic content of the variation. Symmetrical modulation methods, such as that described with reference to FIG. 3, split the inactive period t0 in half, placing one half t0/2 before the active period and the other half t0/2 after the active period. The advantage of this is the current flow (and hence heating) is balanced between the upper switches (200a, 300a, 400a) and the lower switches (200b, 300b, 400b). The random sequence of this embodiment of the invention achieves a ratio of ta:tb≠1:1 over the 256 element sequence. This balances the current flow between the upper switches and the lower switches without symmetrical modulation.

A 256 element series is easy to control in software since it is a power of 2 in length. Sequences larger than 256 elements provide diminishing returns and require significantly more microprocessor capacity. In addition, at 2 kHz, the 256 element sequence completes in 128 ms. Thus, the current flow between upper and lower switches will balance approximately every 128 ms. Since this is approximately the time taken for many IGBTs to heat up, this is a further advantage of a 256 element sequence.

However, other sequence lengths are possible. Random or frequency bounded white noise data could alternatively be used to determine the ratio of ta:tb in a given switching period. The aim is to reduce the periodic content and preferably also allow current balancing.

In addition, phase current is often measured through shunts in series with the lower switches (200b, 300b, 400b). Thus, the phase current can only be measured when the lower switches (which may be IGBTs) are on. In the space vector modulation scheme of FIG. 4, the lower switches are on when the upper switches are off i.e. during ta, rather than during tb. Thus, in some embodiments, it is preferred for the ratio of ta:tb, to be weighted towards ta. This may be done by setting the random sequence to favour ta, such that ratio of ta:tb≠1:1 over the 256 element sequence but is, in fact, weighted towards ta. This produces a greater reduction of the switching frequency noise. Alternatively, a minimum (non-zero) value may be set for ta to ensure that the phase current can be measured through the shunts connected in series with the lower switches. This guarantees good current measurement every switching period. In either case, the particular ta:tb ratio will be different in each switching period and the ratio will not average to 1:1 but will be weighted towards ta to ensure the current can be measured through the shunts.

Figure 5A:
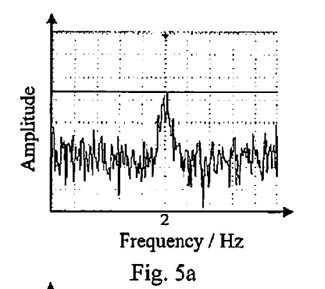
FIG. 5a shows the frequency content of the output voltage for a 2 kHz switching period using a standard asymmetric modulation technique.
Figure 5B:
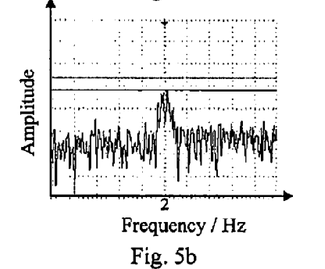
FIG. 5b shows the frequency content of the output voltage for a 2 kHz switching period using the asymmetric modulation of an embodiment of the invention.
Figure 6A:
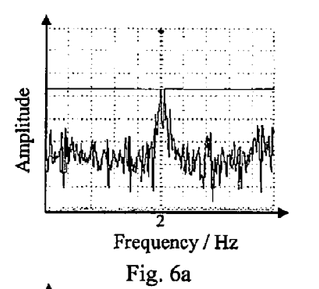
FIG. 6a shows the frequency content of the output voltage for a 3 kHz switching period using a standard asymmetric modulation technique.
Figure 6B:
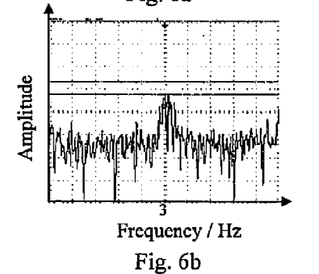
FIG. 6b shows the frequency content of the output voltage for a 3 kHz switching period using the asymmetric modulation of an embodiment of the invention.
Figure 7A:
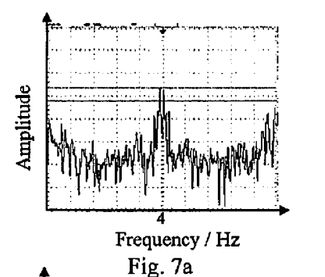
FIG. 7a shows the frequency content of the output voltage for a 4 kHz switching period using a standard asymmetric modulation technique.
Figure 7B:
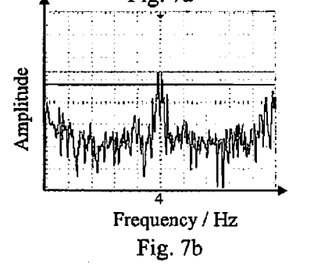
FIG. 7b shows the frequency content of the output voltage for a 4 kHz switching period using the asymmetric modulation of an embodiment of the invention.
Figure 8A:
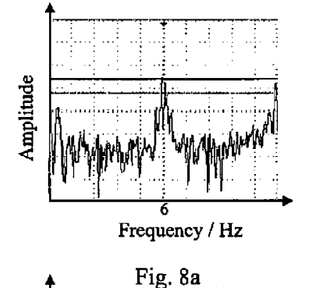
FIG. 8a shows the frequency content of the output voltage for a 6 kHz switching period using a standard asymmetric modulation technique.
Figure 8B:
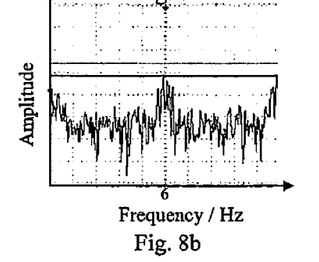
FIG. 8b shows the frequency content of the output voltage for a 6 kHz switching period using the asymmetric modulation of an embodiment of the invention.

FIG. 5a shows the output voltage for a 2 kHz switching period using a standard asymmetric modulation technique. In the standard asymmetric modulation technique of FIGS. 5a, 6a, 7a and 8a, a limit is placed on ta so that it is never less than the time required for current measurement through the shunt resistors in series with the IGBT. When the required output voltage is high, the length of tb may be reduced to be lower than ta, making the modulation asymmetric. However, unlike the invention, the ta:tb ratio is set, rather than changed every switching period, optionally in response to a random sequence. FIG. 5b shows the output voltage for a 2 kHz switching period using the asymmetric modulation of an embodiment of the invention. Similarly, FIG. 6a shows the output voltage for a 3 kHz switching period using the standard asymmetric modulation technique described above and FIG. 6b shows the output voltage for a 3 kHz switching period using the asymmetric modulation of an embodiment of the invention. Similarly, FIG. 7a shows the output voltage for a 4 kHz switching period using the standard asymmetric modulation technique described above and FIG. 7b shows the output voltage for a 4 kHz switching period using the asymmetric modulation of an embodiment of the invention. FIG. 8a shows the output voltage for a 6 kHz switching period using the standard asymmetric modulation technique described above and FIG. 8b shows the output voltage for a 6 kHz switching period using the asymmetric modulation of an embodiment of the invention.

In FIGS. 5a to 8b, a 200 V AC drive was set with a 20 Hz demand and fed a 230 V, 370 W 4 pole induction machine. The resulting phase to phase output shown in FIGS. 5a to 8b was measured and analysed using a Tektronix 2024. The oscilloscope used a rectangular Fast Fourier Transform (FFT) filter with 2048 points. The voltage input was not filtered prior to the oscilloscope, where it was sampled without averaging with a 20 MHz BW input filter. The waves shown in FIGS. 5 to 8 are centred on the switching frequency, 2 kHz in the case of FIGS. 5a and 5b, 3 kHz in the case of FIGS. 6a and 6b, 4 kHz in the case of FIGS. 7a and 7b, and 6 kHz in the case of FIGS. 8a and 8b.

Comparing FIGS. 5a, 6a, 7a and 8b with FIGS. 5b, 6b, 7b and 8b respectively, it can be seen that the effect of the asymmetric modulation technique of the embodiment of the invention compared with the standard asymmetric modulation technique is to reduce the amplitude of and spread the spectrum about the switching frequency. On average, the magnitude of the switching frequency fundamental component has reduced by 50% (from 35.5 V RMS to 17.8 V RMS). The effect is very dependent on the modulation index, that is, the magnitude of the effect depends on the ratio between active and inactive portions which set the output voltage. The magnitude of the effect is greater at low output voltage, as already mentioned, since lower output voltages have a greater inactive portion which can be varied. The second harmonic of the switching frequency is almost unchanged. Thus, compared with prior art arrangements, there is a reduced acoustic noise peak at the switching frequency, without altering the switching period or swapping between switching frequencies.

The invention claimed is:

1. A method for reducing noise in a power converter by controlling a switching device in the power converter according to a modulation scheme, the switching device for coupling a direct current (DC) source to provide an alternating current (AC) output at a particular switching frequency, the method comprising the step of:
    in each switching period, switching the switching device between an active configurations providing a finite voltage at the AC output and an inactive configurations providing a zero voltage at the AC output;
    wherein a ratio between a total period of time in which the switching device is in the active configuration and the total period of time in which the switching device is in the inactive configuration is the same for each switching period and is determined according to a desired voltage at the AC output; and
    wherein, in each switching period, there are at least two time periods in which the switching device is in the inactive configuration, and a ratio between those at least two time periods is changed every switching period.

2. The method of claim 1, wherein the ratio between the at least two time periods in which the switching device is in the inactive configuration is changed every switching period in dependence upon a random sequence generated for each switching period.

3. The method of claim 2, wherein the random sequence comprises 256 elements.

4. The method of claim 1, wherein the power converter comprises a three phase power inverter.

5. The method of claim 4, wherein at least one of the switches in the three phase inverter is an insulated gate bipolar transistor (IGBT).

6. The method of claim 4, wherein the ratio between the at least two time periods in which the switching device is in the inactive configuration is weighted towards configurations in which a selected switch in each phase of the three phase inverter is on.

7. A control system for reducing noise in a power converter switching device, the switching device for coupling a direct current (DC) source to provide an alternating current (AC) output at a particular switching frequency, the control system comprising:
    a controller for switching the switching device in the power converter according to a modulation scheme, the controller being arranged to switch the switching device, in each switching period, between an active configurations providing a finite voltage at the AC output and an inactive configurations providing a zero voltage at the AC output;
    wherein a ratio between a total period of time in which the switching device is in the active configuration and a total period of time in which the switching device is in the inactive configuration is the same for each switching period and is determined according to a desired voltage at the AC output; and
    wherein, in each switching period, there are at least two time periods in which the switching device is in the inactive configuration, and a ratio between those at least two time periods is changed every switching period.

8. The control system of claim 7, wherein the ratio between the at least two time periods in which the switching device is in the inactive configuration is changed every switching period in dependence upon a random sequence generated for each switching period.

9. The control system of claim 8, wherein the random sequence comprises 256 elements.

10. The control system of claim 7, wherein the power converter comprises a three phase power inverter.

11. The control system of claim 10, wherein at least one of the switches in the three phase inverter is an insulated gate bipolar transistor (IGBT).

12. The control system of claim 10, wherein the ratio between the at least two time periods in which the switching device is in the inactive configuration is weighted towards configurations in which a selected switch in each phase of the three phase inverter is on.

13. A switching power converter comprising:
    a switching device for coupling a direct current (DC) source to provide an alternating current (AC) output at a particular switching frequency; and
    a controller for reducing noise in the power converter by switching the switching device according to a modulation scheme, the controller being arranged to switch the switching device, in each switching period, between active configurations providing a finite voltage at the AC output and inactive configurations providing a zero voltage at the AC output;
    wherein a ratio between a total period of time in which the switching device is in the active configuration and a total period of time in which the switching device is in the inactive configuration is the same for each switching period and is determined according to a desired voltage at the AC output; and
    wherein, in each switching period, there are at least two time periods in which the switching device is in the inactive configuration, and a ratio between those at least two time periods is changed every switching period.

14. The switching power converter of claim 13, wherein the ratio between the at least two time periods in which the switching device is in the inactive configuration is changed every switching period in dependence upon a random sequence generated for each switching period.

15. The switching power converter of claim 14, wherein the random sequence comprises 256 elements.

16. The switching power converter of claim 13, wherein the power converter comprises a three phase power inverter.

17. The switching power converter of claim 16, wherein at least one of the switches in the three phase inverter is an insulated gate bipolar transistor (IGBT).

18. The switching power converter of claim 16, wherein the ratio between the at least two time periods in which the switching device is in the inactive configuration is weighted towards configurations in which a selected switch in each phase of the three phase inverter is on.

* * * * *

UNITED STATES PATENT AND TRADEMARK OFFICE
CERTIFICATE OF CORRECTION

| | | |
|---|---|---|
| PATENT NO. | : 8,958,222 B2 | Page 1 of 1 |
| APPLICATION NO. | : 13/969992 | |
| DATED | : February 17, 2015 | |
| INVENTOR(S) | : Simon David Hart | |

It is certified that error appears in the above-identified patent and that said Letters Patent is hereby corrected as shown below:

Claims

In column 9, line 36, claim 1 please replace "configurations" with "configuration."

In column 9, line 37, claim 1 please replace "configurations" with "configuration."

In column 9, line 40, claim 1 please replace "active configuration and the total period" with "active configuration and a total period."

In column 10, line 7, claim 7 please replace "configurations" with "configuration."

In column 10, line 9, claim 7 please replace "configurations" with "configuration."

Signed and Sealed this
Thirty-first Day of May, 2016

Michelle K. Lee
*Director of the United States Patent and Trademark Office*